(12) United States Patent
Papadimitriou (10) Patent No.: US 9,094,275 B1
(45) Date of Patent: Jul. 28, 2015

(54) INTERFERENCE CANCELLATION (IC) RECEIVER

(71) Applicant: NOKIA CORPORATION, Espoo (FI)

(72) Inventor: Panayiotis Papadimitriou, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/568,945

(22) Filed: Dec. 12, 2014

(51) Int. Cl.
H04B 1/10 (2006.01)
H04L 25/28 (2006.01)
H04L 27/26 (2006.01)

(52) U.S. Cl.
CPC .................. *H04L 27/2688* (2013.01)

(58) Field of Classification Search
CPC ............ H04L 25/03038; H04L 27/2647; H04L 5/0021; H04L 27/2659
USPC ............. 375/350, 346, 348; 348/604, 614; 370/203
See application file for complete search history.

(56) References Cited

U.S. PATENT DOCUMENTS

| 2003/0133403 | A1* | 7/2003 | Castelain et al. | 370/203 |
| 2004/0125235 | A1* | 7/2004 | Kim et al. | 348/607 |
| 2009/0135922 | A1* | 5/2009 | Kang et al. | 375/260 |

* cited by examiner

*Primary Examiner* — Khai Tran
(74) *Attorney, Agent, or Firm* — Squire Patton Boggs (US) LLP (57) ABSTRACT

Systems, methods, apparatuses, and computer program products for interference cancellation (IC) are provided. One method includes detecting, by a receiver, a synchronization signal with most power in correlation peak and obtaining the network identity and a location of a corresponding synchronization signal in a received signal. The method may further include extracting a corresponding portion of the received signal that corresponds to the location of the interfering synchronization signal, passing the portion of the received signal through fast fourier transform (FFT) and multiplying result with corresponding frequency-domain conjugated reference synchronization signal to produce channel estimate H, passing the channel estimate H through inverse fast fourier transform (IFFT) to produce channel estimate h, truncating h to a length x, obtaining an estimate of the interfering signal by filtering the time-domain reference synchronization signal by the truncated h, and performing interference cancellation by subtracting the estimated interfering signal from a received signal at said location.

19 Claims, 6 Drawing Sheets

INTERFERENCE CANCELLATION (IC) RECEIVER

BACKGROUND

1. Field

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) and/or future 5G radio access technology. In particular, some embodiments may relate to interference cancellation (IC), and Orthogonal Frequency-Division Multiplexing (OFDM).

2. Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One the key features of LTE-A is carrier aggregation, which allows for increasing the data rates through aggregation of two or more LTE carriers.

SUMMARY

One embodiment includes a method, which may include detecting, by a receiver, a synchronization signal with most power in correlation peak and obtaining a network identity and a location of an interfering synchronization signal in a received signal. The method may further include extracting a portion of the received signal that corresponds to the location of the interfering synchronization signal, passing the portion of the received signal through a fast fourier transform (FFT) and multiplying a result with a frequency-domain conjugated reference synchronization signal corresponding to the obtained network identity to produce channel estimate H, passing the channel estimate H through an inverse fast fourier transform (IFFT) to produce channel estimate h, truncating h to a length x, obtaining an estimate of the interfering synchronization signal by filtering the time-domain reference synchronization signal corresponding to the obtained network identity by the truncated h, and performing interference cancellation by subtracting the estimated interfering signal from the received signal at said location. In one embodiment, the length x that h is truncated by may be equal to 1.

In an embodiment, the synchronization signal may be a primary synchronization signal (PSS) and the network identity may be NID2. In an embodiment, the synchronization signal may be a primary D2D synchronization signal (PD2DSS) and the network identity may be NID2.

According to certain embodiments, the interfering synchronization signal may comprise a signal from an interfering cell with the same network identity. In one embodiment, a delay equal to or less than half length of a cyclic prefix exists between the PSS and a PSS of the interfering cell.

Another embodiment is directed to an apparatus, which may include at least one processor and at least one memory including computer program code. The at least one memory and the computer program code may be configured, with the at least one processor, to cause the apparatus at least to detect a synchronization signal with most power in correlation peak and obtain a network identity and a location of an interfering synchronization signal in a received signal, extract a portion of the received signal that corresponds to the location of the interfering synchronization signal, pass the portion of the received signal through a fast fourier transform (FFT) and multiply a result with a frequency-domain conjugated reference synchronization signal corresponding to the obtained network identity to produce channel estimate H, pass the channel estimate H through an inverse fast fourier transform (IFFT) to produce channel estimate h, truncate h to a length x, obtain an estimate of the interfering synchronization signal by filtering the time-domain reference synchronization signal corresponding to the obtained network identity by the truncated h, and perform interference cancellation by subtracting the estimated interfering signal from the received signal at said location. In one embodiment, the length x that h is truncated by may be equal to 1. In certain embodiments, the apparatus may be a user equipment.

In an embodiment, the synchronization signal may be a primary synchronization signal (PSS) and the network identity may be NID2. In an embodiment, the synchronization signal may be a primary D2D synchronization signal (PD2DSS) and the network identity may be NID2.

According to certain embodiments, the interfering synchronization signal may comprise a signal from an interfering cell with the same network identity. In one embodiment, a delay equal to or less than half length of a cyclic prefix exists between the PSS and a PSS of the interfering cell.

Another embodiment is directed to a computer program, embodied on a non-transitory computer readable medium. The computer program may be configured to control a processor to perform a process. The process may include detecting, by a receiver, a synchronization signal with most power in correlation peak and obtaining a network identity and a location of a corresponding synchronization signal in a received signal, extracting a corresponding portion of the received signal that corresponds to the location of the interfering synchronization signal, passing the portion of the received signal through fast fourier transform (FFT) and multiplying result with corresponding frequency-domain conjugated reference synchronization signal corresponding to the obtained network identity to produce channel estimate H, passing the channel estimate H through inverse fast fourier transform (IFFT) to produce channel estimate h, truncating h to a length x, obtaining an estimate of the interfering signal by filtering the time-domain reference synchronization signal corresponding to the obtained network identity by the truncated h, and performing interference cancellation by subtracting the estimated interfering signal from a received signal at said location. In one embodiment, the length x that h is truncated by may be equal to 1.

Another embodiment is directed to an apparatus including means for detecting a synchronization signal with most power in correlation peak and obtaining a network identity and a location of a corresponding synchronization signal in a received signal. The apparatus may further include means for extracting a corresponding portion of the received signal that corresponds to the location of the interfering synchronization signal, for passing the portion of the received signal through fast fourier transform (FFT) and multiplying result with corresponding frequency-domain conjugated reference synchronization signal corresponding to the obtained network identity to produce channel estimate H, means for passing the channel estimate H through inverse fast fourier transform (IFFT) to produce channel estimate h, means for truncating h to a length x, means for obtaining an estimate of the interfering signal by filtering the time-domain reference synchronization signal corresponding to the obtained network identity by the truncated h, and means for performing interference cancellation by subtracting the estimated interfering signal from a received signal at said location. In one embodiment, the length x that h is truncated by may be equal to 1.

Another embodiment is directed to a method, which includes obtaining a first network identity, detecting, by a receiver, a synchronization signal based at least part on the first network identity, and obtaining a second network identity and a location of a corresponding synchronization signal in a received signal, as a result of the said detection. The method may further include extracting a corresponding portion of the received signal that corresponds to the said location of the synchronization signal, passing the corresponding portion of the received signal through fast fourier transform (FFT) and multiplying a result with corresponding frequency-domain conjugated reference synchronization signal (the reference synchronization signal corresponding to the first and second network identities) to produce channel estimate H2, passing the channel estimate H2 through inverse fast fourier transform (IFFT) to produce channel estimate h2, truncating h2 to a length x, obtaining an estimate of the interfering signal by filtering the time-domain reference synchronization signal (the reference synchronization signal corresponding to the first and second network identities) by the truncated h2, and performing interference cancellation by subtracting the estimated interfering signal from a received signal at said location. In one example embodiment, the length x=1.

In an embodiment, the synchronization signal may be a secondary synchronization signal (SSS), the first network identity may be NID2 and the second network identity may be NID1. In an embodiment, the synchronization signal may be a secondary D2D synchronization signal (SD2DSS) and the first network identity may be NID2 and the second network identity may be NID1 According to one embodiment, the interfering synchronization signal may be a signal from an interfering cell, the interfering cell having the same first network identity as the serving cell. In certain embodiments, a delay equal to or less than half length of a cyclic prefix exists between the SSS of the serving cell and a SSS of the interfering cell.

Another embodiment is directed to an apparatus, which may include at least one processor and at least one memory including computer program code. The at least one memory and the computer program code may be configured, with the at least one processor, to cause the apparatus at least to obtain a first network identity, detect a synchronization signal based at least in part on the first network identity, obtain a second network identity and a location of a corresponding synchronization signal in a received signal as a result of the said detection, and extract a corresponding portion of the received signal that corresponds to the location of the synchronization signal. The receiver may be further configured to pass the corresponding portion of the received signal through a fast fourier transform (FFT) and multiply a result with a corresponding frequency-domain conjugated reference synchronization signal (the reference synchronization signal corresponding to the first and second network identities) to produce channel estimate H2, pass the channel estimate H2 through an inverse fast fourier transform (IFFT) to produce channel estimate h2, truncate h2 to a length x, obtain an estimate of the interfering signal by filtering the time-domain reference synchronization signal (the reference synchronization signal corresponding to the first and second network identities) by the truncated h2, and perform interference cancellation by subtracting the estimated interfering signal from a received signal at said location. In one example embodiment, the length x=1.

In an embodiment, the synchronization signal may be a secondary synchronization signal (SSS), the first network identity may be NID2 and the second network identity may be NID1. In an embodiment, the synchronization signal may be a secondary D2D synchronization signal (SD2DSS) and the first network identity may be NID2 and the second network identity may be NID1. According to one embodiment, the interfering synchronization signal may be a signal from an interfering cell, the interfering cell having the same first network identity. In certain embodiments, a delay equal to or less than half length of a cyclic prefix exists between the SSS of the serving cell and a SSS of the interfering cell.

Another embodiment may be directed to a computer program, which may be embodied on a non-transitory computer readable medium. The computer program may be configured to control a processor to perform a process, which may include obtaining a first network identity, detecting, by a receiver, a synchronization signal based at least part on the first network identity, and obtaining a second network identity and a location of a corresponding synchronization signal in a received signal, as a result of the said detection. The method may further include extracting a corresponding portion of the received signal that corresponds to the location of the synchronization signal, passing the corresponding portion of the received signal through fast fourier transform (FFT) and multiplying a result with corresponding frequency-domain conjugated reference synchronization signal (the reference synchronization signal corresponding to the first and second network identities) to produce channel estimate H2, passing the channel estimate H2 through inverse fast fourier transform (IFFT) to produce channel estimate h2, truncating h2 to a length x, obtaining an estimate of the interfering signal by filtering the time-domain reference synchronization signal (the reference synchronization signal corresponding to the first and second network identities) by the truncated h2, and performing interference cancellation by subtracting the estimated interfering signal from a received signal at said location.

Another embodiment is directed to an apparatus, which may include means for obtaining a first network identity, means for detecting a synchronization signal based at least part on the first network identity, and means for obtaining a second network identity and a location of a corresponding synchronization signal in a received signal, as a result of the said detection. The apparatus may further include means for extracting a corresponding portion of the received signal that corresponds to the location of the synchronization signal, means for passing the corresponding portion of the received signal through fast fourier transform (FFT) and multiplying a result with corresponding frequency-domain conjugated reference synchronization signal (the reference synchronization signal corresponding to the first and second network identities) to produce channel estimate H2, means for passing the channel estimate H2 through inverse fast fourier transform (IFFT) to produce channel estimate h2, means for truncating h2 to a length x, means for obtaining an estimate of the interfering signal by filtering the time-domain reference synchronization signal (the reference synchronization signal corresponding to the first and second network identities) by the truncated h2, and means for performing interference cancellation by subtracting the estimated interfering signal from a received signal at said location.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for interference cancellation (IC), as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments of the invention are directed to interference cancellation (IC) receivers, such as IC orthogonal frequency division multiplexing (OFDM) receivers. In one embodiment, an IC receiver is provided for the detection of synchronization signals in the presence of interference from other cells.

Synchronization signals may be needed for a UE that is attempting to enter a network to become synchronized with an eNB or possibly for a UE to maintain its already gained synchronization. Therefore, cell synchronization may be considered the first step when a UE wants to camp on any cell. From this, the UE may acquire the physical cell ID (PCI), time slot and frame synchronization, which will enable the UE to read system information blocks from a particular network. There are two synchronization signals in LTE downlink (DL): the primary synchronization signal (PSS) and the secondary synchronization signal (SSS).

The PSS is a Zadoff-Chu sequence of length 62, whose root index is chosen based on the NID2 value, which is obtained from the physical cell ID. There can be three different NID2 values (0, 1, 2), and thus there are 3 different root indexes (25, 29, 34) corresponding to the NID2 values.

The SSS is a combination of two 31 length binary sequences that are a function of NID1. There can be 168 different NID1 values, and thus there are 168 different binary sequences corresponding to these NID1. These binary sequences may also be scrambled with a scrambling sequence which is function of NID2, thereby creating a coupling between PSS & SSS. In one example, the NID may refer to a network identifier or cell identity, for instance.

In a multi-cell deployment, as well as in small cells deployment, the detection of the synchronization signals becomes more difficult at certain signal-to-noise ratio (SNR) due to the presence of heavy interference. As a result, the usage of interference cancellation receivers for the synchronization signals becomes particularly important.

A challenge in the IC receivers, for the synchronization signals, is the channel estimation of the interferers, which may be necessary in order to reconstruct the interferers' signals, and subtract them from the received signal.

In an embodiment, it may be assumed that the UE receiver has knowledge of the interferers and their cell IDs. According to one embodiment, the receiver may be configured to: 1) detect the interfering PSS with the most power in the correlation Peak, and obtain NID2 and the location of the corresponding interfering PSS in the received signal, 2) extract the corresponding portion (that corresponds to the location of that interfering PSS signal) of the received signal, 3) pass that portion of the received signal through fast fourier transform (FFT), and 4) multiply the result with the corresponding frequency-domain conjugated reference PSS (corresponding to the detected NID2) signal, where the resulting product is the channel estimate H.

If it is assumed that there is an interfering cell with same NID2 as the cell the receiver is camped on, then the above channel estimate H will not help in distinguishing the interferer in additive white Gaussian noise (AWGN) channel conditions (and even in fading channel conditions the performance is much degraded, depending on the correlation of the corresponding channel estimates).

Therefore, embodiments of the invention provide the following additional steps. For example, the receiver may be further configured to: 5) pass the estimate H through an inverse fast fourier transform (IFFT) and obtain channel estimate h, 6) truncate h to length x, 7) obtain an estimate of the interfering PSS signal by filtering the time-domain reference PSS (corresponding to the detected NID2) signal by h, and 8) perform the interference cancellation by subtracting the obtained estimated PSS interfering signal from the received signal at said location of the interfering PSS signal.

Another embodiment may be directed to SSS, and be configured to: 1b) use the detected NID2 and detect the SSS, using a correlation receiver, or through other SSS detector means, and obtain NID1 and the location of the corresponding SSS in the received signal, as a result of the said SSS detection, 2b) extract the corresponding portion (that corresponds to the above location) of the received signal, 3b) pass that portion of the received signal through fast fourier transform (FFT), and 4b) multiply the result with the corresponding frequency-domain conjugated reference SSS (corresponding to the detected NID1, and detected NID2) signal, where the resulting product is the channel estimate H2 (which is different than the H of PSS).

In this embodiment, the receiver may be further configured to: 5b) pass the estimate H2 through an inverse fast fourier transform (IFFT) and obtain channel estimate h2, 6b) truncate h2 to length x, 7b) obtain an estimate of the interfering SSS signal by filtering the time-domain reference SSS (corresponding to the detected NID2 and NID1) signal by h2, and 8b) perform the interference cancellation by subtracting the obtained estimated SSS interfering signal from the received signal at said location of the interfering SSS signal obtained in step 1b.

Figure 1:
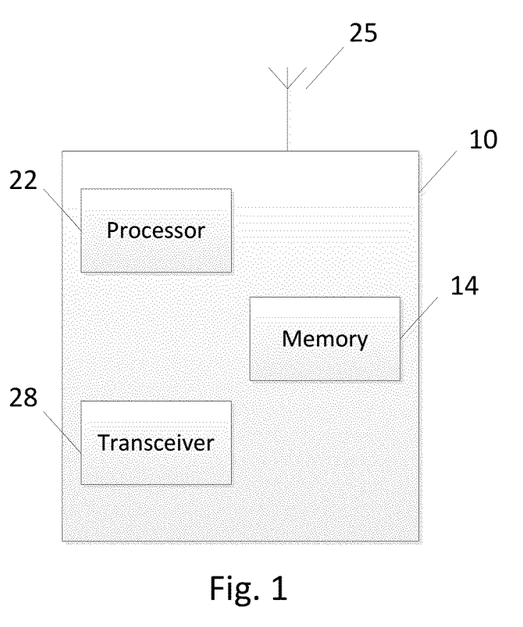
FIG. 1 illustrates a block diagram of an apparatus, according to one embodiment.

FIG. 1 illustrates an example of an apparatus 10 according to an embodiment. In an embodiment, apparatus 10 may be a node, host, or device associated with a communications network or in communication with such a network. For example, in one embodiment apparatus 10 may be a mobile device or node, such as a UE in LTE. It should be noted that one of ordinary skill in the art would understand that apparatus 10 may include components or features not shown in FIG. 1.

As illustrated in FIG. 1, apparatus 10 may include or be coupled to a processor 22 for processing information and executing instructions or operations. Processor 22 may be any type of general or specific purpose processor. While a single processor 22 is shown in FIG. 1, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In one example, apparatus 10 may also include or be coupled to one or more antennas 25 for aiding in the transmitting and receiving signals and/or data to and from apparatus 10. For instance, antennas 25 may be capable of converting electrical power into radio waves, and vice versa. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including (but not limited to) processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a mobile device or UE, for example. In this embodiment, apparatus 10 or, in some embodiments, transceiver 28, may be controlled by memory 14 and processor 22 to detect a synchronization signal with the most power in the correlation peak and obtain a NID and a location of a corresponding synchronization signal in the received signal. In one embodiment, the synchronization signal is a PSS and the NID is NID2. In another embodiment, the synchronization signal may be a primary D2D synchronization signal (PD2DSS) and the network identity may be NID2.

In this embodiment, apparatus 10, or transceiver 28, may then be controlled by memory 14 and processor 22 to extract the portion of the received signal that corresponds to the location of the corresponding interfering synchronization signal, to pass the portion of the signal through a fast fourier transform (FFT) and multiply the result with the frequency-domain conjugated reference synchronization signal (the reference synchronization signal is obtained using the detected NID) to produce a channel estimate H, to pass the channel estimate H through an inverse fast fourier transform (IFFT) to produce channel estimate h, to truncate h to a length x, to obtain an estimate of the interfering synchronization signal by filtering the time-domain reference synchronization signal (the reference synchronization signal is obtained using the detected NID) by h, and to perform interference cancellation by subtracting the estimated interfering synchronization signal from a received signal at said location. In one embodiment, the length x may be 1.

In another embodiment, apparatus 10, or transceiver 28, may be controlled by memory 14 and processor 22 to obtain a first network identity, detect a synchronization signal based at least in part on the first network identity, and obtain a second network identity and a location of a corresponding interfering synchronization signal in a received signal, as a result of the said detection. In this embodiment, the interfering synchronization signal may be a secondary synchronization signal (SSS), the first network identity may be NID2 and the second network identity may be NID1. In an embodiment, the synchronization signal may be a secondary D2D synchronization signal (SD2DSS) and the first network identity may be NID2 and the second network identity may be NID1.

Apparatus 10, or transceiver 28, may then be controlled by memory 14 and processor 22 to extract the portion of the received signal that corresponds to the location of the corresponding interfering synchronization signal, pass the portion of the received signal through a fast fourier transform (FFT) and multiply a result with a frequency-domain conjugated reference synchronization signal (the reference synchronization signal is obtained using the first and second network identity) to produce channel estimate H2, pass the channel estimate H2 through an inverse fast fourier transform (IFFT) to produce channel estimate h2, truncate h2 to a length x, obtain an estimate of the interfering signal by filtering the time-domain reference synchronization signal (the reference synchronization signal is obtained using the first and second network identity) by the truncated h2, and perform interference cancellation by subtracting the estimated interfering signal from the received signal at said location. In one embodiment, the length x may be 1.

Figure 2:
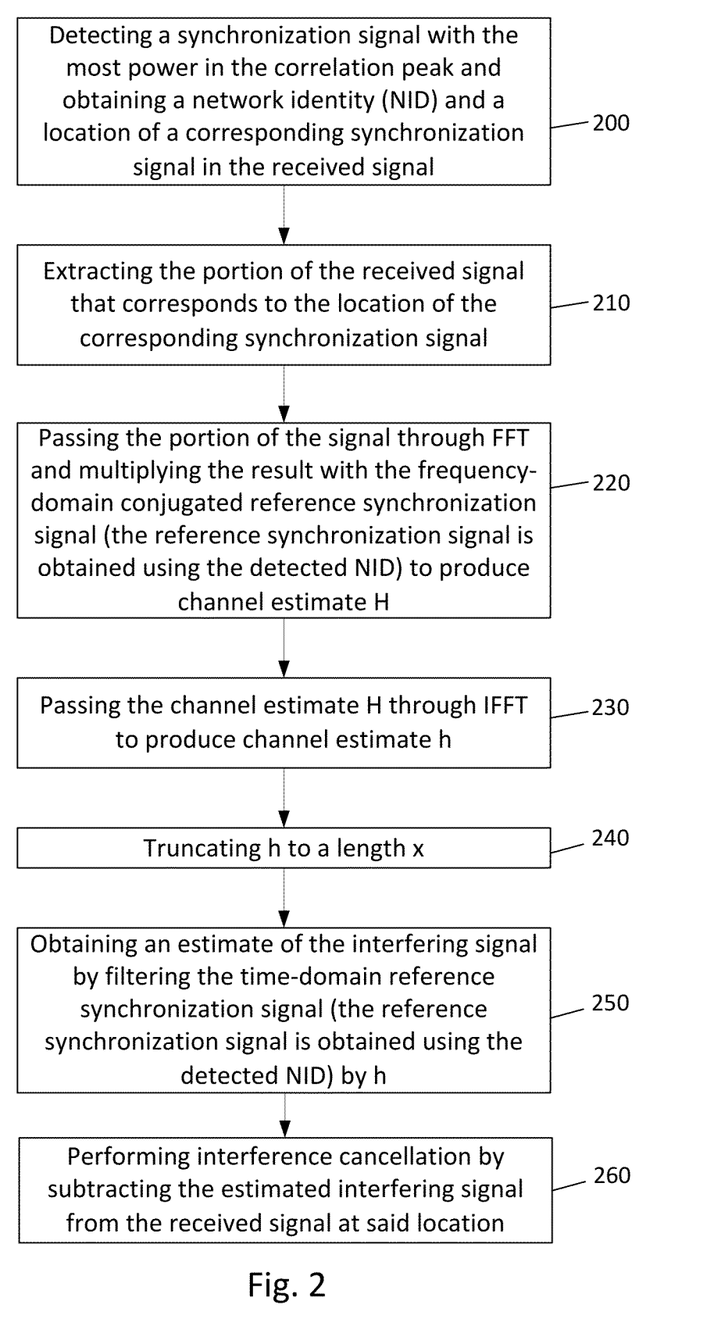
FIG. 2 illustrates a flow diagram of a method, according to an embodiment.

FIG. 2 illustrates an example flow diagram of a method for cancelling interference from a received signal, according to one embodiment. In some embodiments, the method of FIG. 2 may be performed by a user equipment. More particularly, in one embodiment, the method of FIG. 2 may be performed by a receiver of the user equipment. The method may include, at 200, detecting a synchronization signal with the most power in the correlation peak and obtaining a network identity (NID) and a location of a corresponding synchronization signal in the received signal. In certain embodiments, the synchronization signal is a PSS and the NID is NID2. The method may also include, at 210, extracting the portion of the received signal that corresponds to the location of the corresponding synchronization signal found is step 200. The method may then include, at 220, passing the portion of the signal through a fast fourier transform (FFT) and multiplying the result with the frequency-domain conjugated reference synchronization signal (the reference synchronization signal is obtained using the detected NID) to produce channel estimate H.

Continuing with FIG. 2, the method then further includes, at 230, passing the channel estimate H through inverse fast fourier transform (IFFT) to produce channel estimate h, and, at 240, truncating h to a length x. In one embodiment, the length x is 1. However, other lengths for x are also possible and x may be greater than 1. The method also includes, at 250, obtaining an estimate of the interfering signal by filtering the time-domain reference synchronization signal (the reference synchronization signal is obtained using the detected NID) by h and, at 260, performing interference cancellation by subtracting the estimated interfering signal from the received signal at the location identified in step 200.

Figure 3:
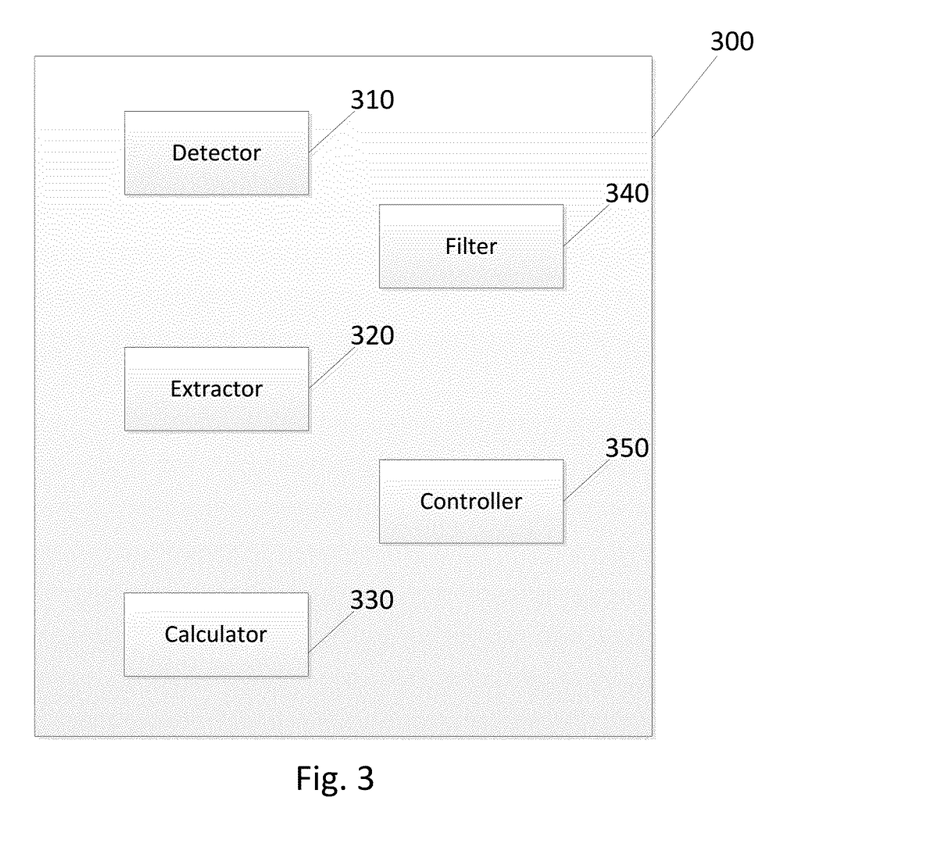
FIG. 3 illustrates a block diagram of an apparatus, according to another embodiment.

FIG. 3 illustrates a block diagram of an apparatus or device 300, according to another embodiment. In certain embodiments, apparatus 300 may be a receiver, transceiver, or other type of receiving unit. Apparatus 300 may include filters, amplifiers and other hardware components. In particular, in the example of FIG. 3, apparatus 300 may include a filter 340 (or filtering means), processor or controller 350 (or processing means), detector 310 (or detecting means), extractor 320 (or extracting means), and calculator 330 (or calculating means).

In one embodiment, as illustrated in FIG. 3, detector 310 may be configured to detect a synchronization signal with the most power in correlation peak and obtain its NID and a location of a corresponding synchronization signal in a received signal. According to certain embodiments, the synchronization signal may be a PSS and the NID is NID2. In other embodiments, the synchronization signal may be a primary D2D synchronization signal (PD2DSS) and the network identity may be NID2.

Referring again to FIG. 3, extractor 320 may be configured to extract a portion of the received signal that corresponds to the location of the interfering synchronization signal. Calculator 330 may be configured to pass the portion of the signal through a fast fourier transform (FFT) and multiply the result with the frequency-domain conjugated reference synchronization signal (the reference synchronization signal corresponding to the obtained NID) to produce channel estimate H, to pass the channel estimate H through an inverse fast fourier transform (IFFT) to produce channel estimate h, and to truncate h to a length x. In an embodiment, x may be equal to 1. Filter 340 may be configured to obtain an estimate of the interfering signal by filtering the time-domain reference synchronization signal (the reference synchronization signal corresponding to the obtained NID) by h. Controller 350 may then be configured to perform interference cancellation by subtracting the estimated interfering signal from the received signal at said location.

It should be noted that the components of receiver or apparatus 300 may be implemented in hardware, software, or in a combination of hardware and software.

Figure 4:
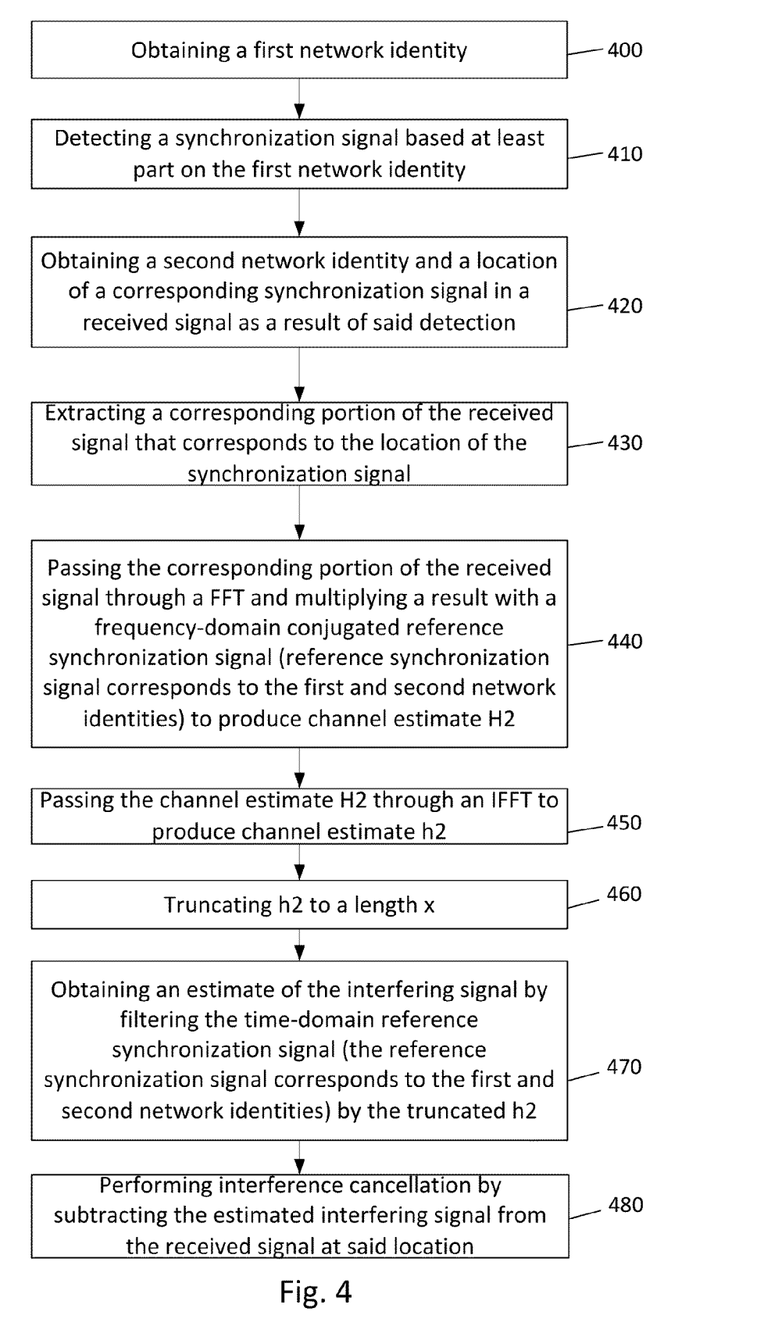
FIG. 4 illustrates a flow diagram of a method, according to another embodiment.

FIG. 4 illustrates an example flow diagram of a method for cancelling interference from a received signal, according to one embodiment. In some embodiments, the method of FIG. 4 may be performed by a user equipment. More particularly, in one embodiment, the method of FIG. 4 may be performed by a receiver of the user equipment, such as a correlation receiver. The method may include, at 400, obtaining a first network identity, such as NID2 and, at 410, detecting a synchronization signal based at least part on the first network identity. In this embodiment, the synchronization signal may be a SSS. The method may also include, at 420, obtaining a second network identity, such as NID1, and a location of a corresponding synchronization signal in a received signal, as a result of the said detection. The method may then include, at 430, extracting a corresponding portion of the received signal that corresponds to the location of the synchronization signal and, at 440, passing the corresponding portion of the received signal through a fast fourier transform (FFT) and multiplying a result with a frequency-domain conjugated reference synchronization signal (reference synchronization signal corresponds to the first and second network identities) to produce channel estimate H2. The method may further include, at 450, passing the channel estimate H2 through an inverse fast fourier transform (IFFT) to produce channel estimate h2, at 460, truncating h2 to a length x, at 470, obtaining an estimate of the interfering signal by filtering the time-domain reference synchronization signal (the reference synchronization signal corresponds to the first and second network identities) by the truncated h2 and, at 480, performing interference cancellation by subtracting the estimated interfering signal from the received signal at said location.

It should be noted that, in some embodiments, the functionality of any of the methods described herein, such as those illustrated in FIGS. 2 and 4 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Figure 5:
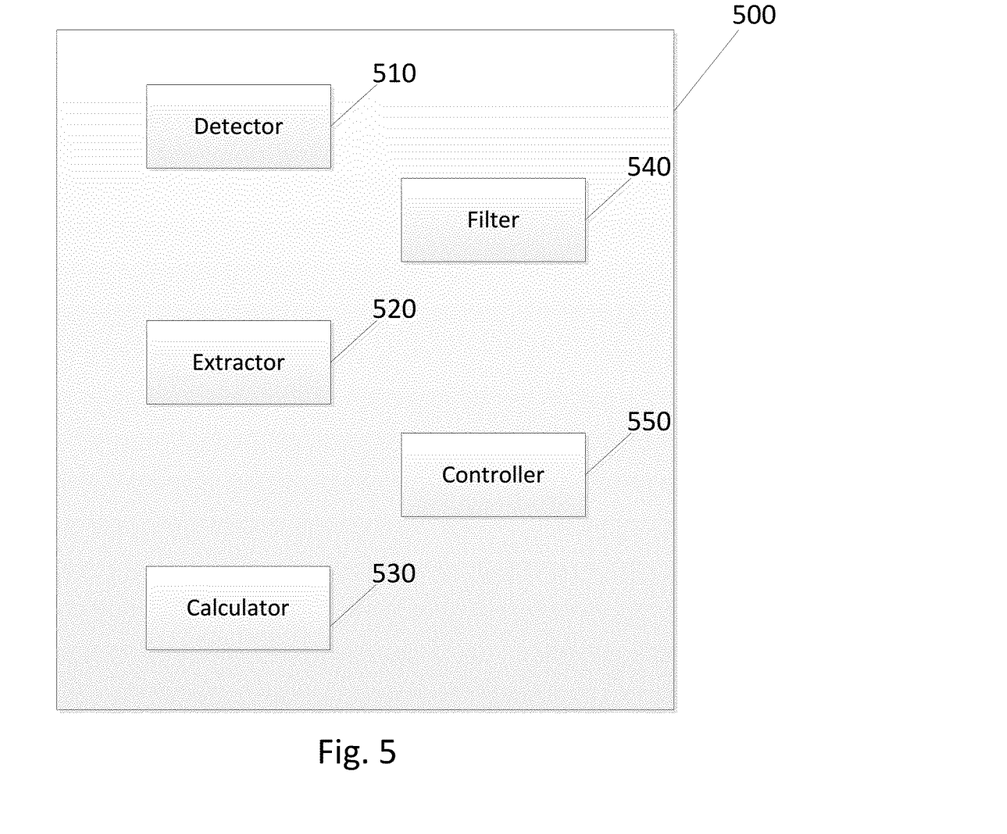
FIG. 5 illustrates a block diagram of an apparatus, according to another embodiment.

FIG. 5 illustrates a block diagram of an apparatus or device 500, according to another embodiment. In certain embodiments, apparatus 500 may be a receiver, transceiver, or other type of receiving unit. Apparatus 500 may include filters, amplifiers and other hardware components. In particular, in the example of FIG. 5, apparatus 500 may include a filter 540 (or filtering means), processor or controller 550 (or processing means), detector 510 (or detecting means), extractor 520 (or extracting means), and calculator 530 (or calculating means).

In one embodiment, as illustrated in FIG. 5, detector 510 may be configured to obtain a first network identity and to detect a synchronization signal based at least in part on the first network identity. Detector 510 may be further configured to obtain a second network identity and a location of a corresponding synchronization signal in a received signal. According to certain embodiments, the synchronization signal may be a secondary synchronization signal (SSS), the first network identity may be NID2, and the second network identity may be NID1.

Extractor 520 may be configured to extract a corresponding portion of the received signal that corresponds to the location of the synchronization signal. Calculator 530 may be configured to pass the corresponding portion of the received signal through a fast fourier transform (FFT) and multiply a result with a corresponding frequency-domain conjugated reference synchronization signal (the reference synchronization signal corresponds to the first and second network identities) to produce channel estimate H2, pass the channel estimate H2 through an inverse fast fourier transform (IFFT) to produce channel estimate h2, and to truncate h2 to a length x. In an embodiment, x may be equal to 1. Filter 540 may be configured to obtain an estimate of the interfering signal by filtering the time-domain reference synchronization signal (the reference synchronization signal corresponds to the first and second network identities) by the truncated h2. Controller 550 may then be configured to perform interference cancellation by subtracting the estimated interfering signal from the received signal at said location.

Figure 6:
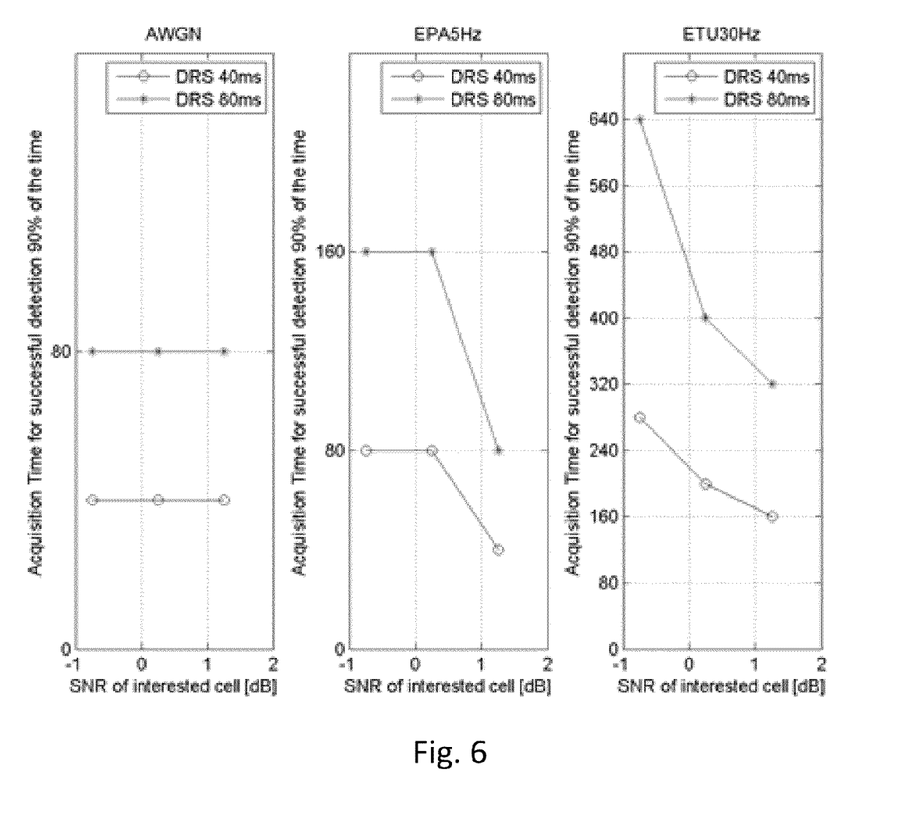
FIG. 6 illustrates graphs depicting simulations that show the performance gains provided by embodiments of the invention.

Embodiments of the invention may provide several advantages, including lower cell acquisition time than other approaches. FIG. 6 depicts graphs that simulate and illustrate the performance gains provided by embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
   detecting, by a receiver, a synchronization signal with most power in correlation peak and obtaining a network identity and a location of an interfering synchronization signal in a received signal;
   extracting a portion of the received signal that corresponds to the location of the interfering synchronization signal;
   passing the portion of the received signal through a fast fourier transform (FFT) and multiplying a result with a frequency-domain conjugated reference synchronization signal corresponding to the obtained network identity to produce channel estimate H;
   passing the channel estimate H through an inverse fast fourier transform (IFFT) to produce channel estimate h;
   truncating h to a length x;
   obtaining an estimate of the interfering synchronization signal by filtering the time-domain reference synchronization signal corresponding to the obtained network identity by the truncated h; and
   performing interference cancellation by subtracting the estimated interfering signal from the received signal at said location.

2. The method according to claim 1, wherein the synchronization signal comprises a primary synchronization signal (PSS) and the network identity comprises NID2.

3. The method according to claim 1, wherein the interfering synchronization signal comprises a signal from an interfering cell with the same network identity.

4. The method according to claim 2, wherein a delay equal to or less than half length of a cyclic prefix length exists between the PSS of the serving cell and a PSS of the interfering cell.

5. The method according to claim 1, wherein the length x=1.

6. The method according to claim 1, wherein the synchronization signal comprises a primary device-to-device (D2D) synchronization signal (PD2DSS) and the network identity comprises NID2.

7. An apparatus, comprising:
   at least one processor; and
   at least one memory including computer program code,
   the at least one memory and computer program code configured, with the at least one processor, to cause the apparatus at least to
   detect a synchronization signal with most power in correlation peak and obtain a network identity and a location of an interfering synchronization signal in a received signal;
   extract a corresponding portion of the received signal that corresponds to the location of the interfering synchronization signal;
   pass the portion of the received signal through a fast fourier transform (FFT) and multiply a result with a frequency-domain conjugated reference synchronization signal corresponding to the obtained network identity to produce channel estimate H;
   pass the channel estimate H through an inverse fast fourier transform (IFFT) to produce channel estimate h;
   truncate h to a length x;
   obtain an estimate of the interfering synchronization signal by filtering the time domain reference synchronization signal corresponding to the obtained network identity by the truncated h; and perform interference cancellation by subtracting the estimated interfering signal from the received signal at said location.

8. The apparatus according to claim 7, wherein the synchronization signal comprises a primary synchronization signal (PSS) and the network identity comprises NID2.

9. The apparatus according to claim 7, wherein the interfering synchronization signal comprises a signal from an interfering cell with the same network identity.

10. The apparatus according to claim 8, wherein a delay equal to or less than half length of a cyclic prefix length exists between the PSS of the serving cell and a PSS of the interfering cell.

11. The apparatus according to claim 7, wherein the length x=1.

12. The apparatus according to claim 7, wherein the synchronization signal comprises a primary device-to-device (D2D) synchronization signal (PD2DSS) and the network identity comprises NID2.

13. The apparatus according to claim 7, wherein the apparatus comprises a user equipment.

14. An apparatus, comprising:
at least one processor; and
at least one memory including computer program code, the at least one memory and computer program code configured, with the at least one processor, to cause the apparatus at least to
obtain a first network identity;
detect a synchronization signal based at least in part on the first network identity;
obtain a second network identity and a location of a corresponding synchronization signal in a received signal as a result of said detection;
extract a corresponding portion of the received signal that corresponds to the location of the synchronization signal;
pass the corresponding portion of the received signal through a fast fourier transform (FFT) and multiply a result with a corresponding frequency domain conjugated reference synchronization signal corresponding to first and second network identities to produce channel estimate H2;
pass the channel estimate H2 through an inverse fast fourier transform (IFFT) to produce channel estimate h2;
truncate h2 to a length x;
obtain an estimate of the interfering signal by filtering the time-domain reference synchronization signal corresponding to first and second network identities by the truncated h2; and
perform interference cancellation by subtracting the estimated interfering signal from the received signal at said location.

15. The apparatus according to claim 14, wherein the synchronization signal comprises a secondary synchronization signal (SSS), the first network identity comprises NID2 and the second network identity comprises NID1.

16. The apparatus according to claim 14, wherein the interfering synchronization signal comprises a signal from an interfering cell with the same first network identity.

17. The apparatus according to claim 15, wherein a delay equal to or less than half length of a cyclic prefix length exists between the SSS of the serving cell and a SSS of the interfering cell.

18. The apparatus according to claim 14, wherein the length x=1.

19. The apparatus according to claim 14, wherein the synchronization signal comprises a secondary D2D synchronization signal (SD2DSS) and the first network identity comprises NID2 and the second network identity comprises NID1.

* * * * *